United States Patent Office 2,934,511
Patented Apr. 26, 1960

2,934,511

METHOD OF CONDITIONING SURFACE SOIL WITH A PHENOL-ALDEHYDE RESIN AND SOIL OBTAINED THEREFROM

Victor Auerbach, North Plainfield, and Cecile L. Tatton, Bound Brook, N.J., assignors to Union Carbide Corporation, a corporation of New York No Drawing. Application January 27, 1955
Serial No. 484,566

18 Claims. (Cl. 260—38)

This invention relates to the conditioning of surface soils to improve their physical structure whereby they will better support or maintain plant growth.

A good surface soil structure not only contains the normal nutrient values required for plant growth, but also is characterized by resistance to rainfall erosion and good tilth whereby the soil granules have a sufficiently loose structure for air and water to readily penetrate the soil structure and be retained for assimilation by plant roots and in addition, resistance to compacting which retards seed germination, root growth and seedling emergence and causes excessive evaporation of soil moisture to the atmosphere.

For generations it has been known that physical improvement of soil resulted from the incorporation of humus or decaying organic matter such as peat, animal manures, and "green manures" which are crops such as clover, rye and the like grown for the purpose of being plowed back into the soil as a source of humus and plant food. This manner of soil improvement or cultivation requires years of effort to gradually impart satisfactory properties to poor soil due to the relatively slow rate of decomposition of the organic material by soil bacteria. Moreover, in many potential plant growth regions an adequate supply of humus forming organic material is either not immediately available or else cannot be supplied economically.

As one alternative to the use of organic humus-forming materials, there has relatively recently been promoted as a soil conditioner various synthetic water-soluble polymers, such as polyacrylamides, alkaline salts of polyacrylic acid and salts of copolymers of maleic acid and vinyl monomers. However, such water-soluble polymers are as of the present still too high in price for general use on farms of any size and at best, have been accepted mostly by home gardeners and in some greenhouse operations.

Furthermore, due to the hygroscopic properties of many of these water-soluble polymers caking of the soil may occur on application unless finely divided granular substances such as talc, clay or gypsum are added to the water-soluble polymer. It has also been observed that while mechanical soil improvement was had from the incorporation of such water-soluble polymers, nevertheless for reasons not known or as yet completely understood, certain crops as for example turnips do not exhibit any worthwhile improvement in yield as compared to the crops obtained on untreatded soils.

It has now been found that the physical structure of surface soils can be improved more economically and with better plant growth results as measured by yields of certain crops by incorporating or dispersing in surface soils small amounts of fusible, organic solvent-soluble, resinous, phenol-aldehyde condensation products which are preferably substantially water-insoluble, but inclusive, however, of resins that tolerate dilution with not more than equal weight of water, and preferably resins having an average molecular weight as determined by the Menzies-Wright method of about 350 to 2000.

The relatively small amounts of phenolic resin which are generally effective in improving surface soil structure range from about 0.001% to 2.0% by weight of the dry soil. From the viewpoint of cost of resins versus improvement in crop yield, it appears that a content of phenolic resin between 0.01% and 0.2% by weight of the soil generally effects the best returns on the investment in phenolic resin soil conditioner.

It has been further found that certain phenolic resins are more effective soil conditioners than others for particular soil structures as will be shown subsequently.

The phenolic resins are generally classified either as acid catalyzed resins, the so-called novolak type, or as alkaline catalyzed resins, the so-called resole type. The novolak resins are generally prepared using less than the required stoichiometric amount of an aldehyde, usually formaldehyde and are fusible resins soluble in organic solvents such as alcohols or ketones. Novolak resins made from phenols having at least two reactive positions on the phenolic ring require the addition of a methylene generating agent such as hexamethylenetetramine to convert them to the infusible, insoluble state. For this reason, the novolak resins are often referred to as two step resins. The resole resins are generally prepared using an amount of formaldehyde in excess of the required stoichiometric amount and consequently do not require the addition of a methylene generating agent, but are heat hardenable per se to infusible, insoluble resins. Such resins are often referred to as one step resins.

The novolak or two step resins are generally fusible, hard, brittle, grindable resins which when prepared from phenol (monohydroxybenzene) and formaldehyde and hexamethylenetetramine added are rapidly converted by heating to the infusible state. Such resins mixed with a filler, e.g. wood flour, are largely used as compression molding materials for the fabrication of a great variety of articles. Novolak resins prepared from ortho and para substituted phenols are not as readily converted to the infusible state. Certain of these, e.g. the para butyl, ampyl and phenyl substituted phenols are soluble in drying oils and in combination with these are widely used in the preparation of rapid drying weather resistant oleoresinous varnishes.

The resole or one step resins may be either liquid, soft, low melting resins, or hard, brittle, grindable resins. The alkaline catalyst may be either, (1) a fixed base such as caustic alkali such as sodium or potassium hydroxide, or one of the alkaline earth oxides or hydroxides; or (2) ammonia or an amine. If a fixed base is used the resins may be a viscous liquid such as is used for casting purposes. If a considerable excess of formaldehyde is used, the resulting resins are water-dispersible or will tolerate the addition of varying amounts of water before resin separation takes place. Either the fixed base or amines may be used to give resins which vary from liquid to soft to hard grindable resins although they are generally not as brittle as the novolak type. Such resins have been used heretofore for the preparation of molding materials, or if made from ortho and para substituted phenols in the preparation of oleoresinous varnishes. These resins are also often employed in alcohol solution as impregnants for paper in the preparation of laminates.

Polyhydric phenols such as resorcinol have also proven useful for the preparation of resins as have other aldehydes, e.g. furfural. Examples of other methylene generating agents are paraform and anhydro-formaldehyde aniline.

Methods for the preparation of phenolic resins are well known and are described in a number of text books, e.g. the monograph entitled "Phenoplasts" by T. S. Carswell, Interscience Publishers, 1947, or the "Chemie der Phenolharze" by K. Hultzsch, Springer Verlag, 1950.

According to this invention, it has been found that the phenolic resins of either type have the ability to stabilize soil granules against the action of water and otherwise condition the soil to improve its tilth. It was also found that these phenolic resins could be somewhat improved in their soil conditioning properties by modifying such resins with phenol-formaldehyde aniline resins or anhydroformaldehyde aniline resins either as mixtures or as co-reactants. Modification of phenolic resins with other materials as for example wood rosin, "Vinsol" or alkylene polyamines also yields resins effective in stabilizing soil.

Preparations of typical phenol-aldehyde resins and modified phenol-aldehyde resins useful in the practice of the present invention as soil conditioners are described in the following examples.

EXAMPLE 1.—TWO STEP PHENOL-FORMALDEHYDE RESIN

A mixture of 100 grams phenol and 73 grams of 37% formalin, adjusted with oxalic acid to pH 1.0–1.1, was vacuum refluxed at 90° C. to cloudiness. The temperature was carefully increased to 120° C. by gradual application of pressure and reflux continued two hours at 120° C. Pressure released and system vacuum dehydrated at 380 mm. pressure until residue temperature reached 160° C. Product discharged into pan and air-cooled. The resulting resin was a hard, brittle, grindable resin of softening point of about 105° C.–110° C.; an average molecular weight of 630; and soluble in acetone, ethyl alcohol and contains less than 15% by weight of water-soluble components.

EXAMPLE 2.—TWO STEP BUTYL PHENOL-FORMALDEHYDE RESIN

One hundred grams p-tert-butyl phenol, 50 grams 37% formalin and 1.0 gram oxalic acid dihydrate refluxed at atmospheric pressure for 11 hours, then dehydrated (atmos.) to a residue temperature of 160° C. Product then heated to 240° C. and steam distilled at this temperature for three hours, mass then cooled to 160° C. by vacuum refluxing, vacuum dehydrated at 160° C. at 35 mm. pressure, then discharged into pan and air cooled. The resulting resin was a hard, brittle, grindable resin having a melting point of 135° C.–140° C., an average molecular weight of 740, soluble in acetone, ethyl alcohol and toluol.

EXAMPLE 3.—TWO STEP PHENOL-FORMALDEHYDE RESIN

A mixture of 100 parts phenol, 57.00 parts formaldehyde (37% aqueous solution) and 0.75 part zinc acetate were refluxed at atmospheric pressure for 2¼ hours, then vacuum dehydrated at 75 mm. pressure to a residue temperature of 80° C., then at atmospheric pressure to a residue temperature of 130° C.–140° C. It was held at this temperature for one hour and then vacuum dehydrated at 75 mm. pressure to 160° C. The resulting resin is a brittle, grindable resin of melting point 90° C., average molecular weight 500 and soluble in ethyl alcohol, acetone, and ethyl acetate.

EXAMPLE 4.—HEXAMINE CATALYZED ONE STEP PHENOL-FORMALDEHYDE RESIN

One hundred grams phenol, 90 grams 37% formalin and 5.6 grams hexamethylenetetramine vacuum refluxed together at 80° C. for 40 minutes, vacuum dehydrated at 110 mm. pressure to a reaction mass temperature of 90° C., and held at this temperature until a sample when tested at 150° C. had a gel time of 95–105 seconds. The resin is then discharged immediately and cooled very rapidly to room temperature. The resin was a hard, brittle resin with a gel time of 65 to 85" at 150° C., an average molecular weight of 345 and soluble in an equal weight ethyl alcohol or acetone.

EXAMPLE 5.—HEXAMINE CATALYZED ONE STEP CRESOL FORMALDEHYDE RESIN

One thousand grams mixed commercial cresols,[1] 892 grams 37% formalin and 60 grams hexamethylenetetramine heated to and refluxed at 80° C. for 35–50 minutes (ca. 16" vac.) then vacuum dehydrated at 40 mm. pressure to a residue temperature of 105° C., held at 103° C.–108° C. until a sample tested at 160° C. had a gel time of 110–130 seconds, discharged immediately and cooled as rapidly as possible. The resulting resin was hard, brittle and grindable with a melting point of about 90° C., average molecular weight 750 and was soluble in an equal weight of ethyl alcohol or acetone.

EXAMPLE 6.—HEXAMINE CATALYZED ONE STEP CRESOL FORMALDEHYDE RESIN SOLUTION

One thousand grams mixed cresols as described in Example 5, 709 grams 37% formalin and 21 grams hexamethylenetetramine heated carefully to 100° C. and refluxed (atmos. pressure) for 55 minutes; vacuum dehydrated at 125 to 150 mm. pressure to a mass temperature of 80° C., then at 85 to 100 mm. pressure to 108° C. One hundred seventy-five grams of commercial ethanol were drawn in slowly to dissolve the resin. Vacuum released carefully as temperature fell below 100° C. Resultant solution refluxed atmospherically (92° C.–94° C.) until a test solution made by diluting a sample of the reaction product with 0.38 times its own weight of ethyl alcohol had a viscosity of 390–485 cst. at 250° C. Product then diluted with 495 grams ethanol, cooled and discharged. The resulting resin solution had a viscosity of 400–600 cps. and a solids content of 60%. The resin solids had an average molecular weight of 410.

EXAMPLE 7.—HEXAMINE-PHENOL ONE STEP RESIN (HEXA TRIPHENOL)

Seven hundred forty grams hexatriphenol (reaction product of 3 mols phenol and 1 mol hexamethylenetetramine) and 370 grams water heated to and held at atmospheric reflux until phase separation occurred (ca. 1½ hours total), vacuum dehydrated at 85 to 100 mm. pressure to 90° C. Heat removed, reaction still exothermic—allowed to go to 120° C., then discharged and cooled rapidly. The resulting resin was hard, brittle and grindable, soluble in ethyl acetate, and having an average molecular weight of about 650.

EXAMPLE 8.—HEXATRIPHENOL ONE STEP RESIN

Four hundred twenty-two grams hexatriphenol and 740 grams 37% formalin were vacuum refluxed at 80° C. (330–350 mm. pressure) until phase separation occurred (cloudiness) then vacuum dehydrated at 150 mm. pressure to mass temperature of 116° C., discharged and cooled rapidly. The resulting resin was hard, brittle and grindable, and soluble in ethyl alcohol; average molecular weight 540.

EXAMPLE 9.—ETHANOL AMINE CATALYZED PHENOL-FORMALDEHYDE ONE STEP RESIN SOLUTION

One thousand grams phenol and 1300 grams 37% formalin mixed together while held at 200 mm. pressure; and then 150 grams monoethanolamine were drawn in at such a rate that temperature does not exceed 35° C. The pressure was then slowly increased and temperature brought to 80° C., then vacuum refluxed at 80° C. for 1½ hours, and then vacuum dehydrated between 50° C.–70° C. until 1000 grams distillate were collected. Seven hundred eighty grams ethyl alcohol were added slowly to the residue to bring product into solution, then cooled

---

[1] Analysis, percent by weight:
10% phenol
16% ortho cresol
40% meta cresol
23% para cresol
11% xylenols and discharged. The resulting resin-alcohol solution had a viscosity of about 200 cps. at 25° C. and solids content 55%. Average molecular weight of the resin solids was 570.

EXAMPLE 10.—ALKYLENE POLYAMINE PHENOL-FORMALDEHYE ONE STEP RESIN SOLUTION

In a five-liter flask fitted with a reflux condenser and stirring equipment, 940 grams (10 mols) of phenol ($C_6H_5OH$), 810 grams (10 mols) aqueous formaldehyde (37%), and 37.6 grams of aqueous ammonia (28%) as a catalyst were reacted by heating to refluxing temperatures at atmospheric pressure until analysis showed practically all the formaldehyde had reacted with the phenol. The resultant resinous syrup was dehydrated by being heated to 50° C. while maintained under subatmospheric pressure at 50 mm. pressure. There was then added to the dehydrated resin a solution of 343 grams (3.3 mols) of diethylene triamine in 300 grams of ethylene glycol monoethyl ether, and heated for 15 minutes under atmospheric reflux to 100° C. The reaction mass was then cooled to 60° C. and a slurry of 200 grams (6.7 mols) of paraformaldehyde in 1000 grams of ethylene glycol monoethyl ether was added thereto and reacted therewith by heating at about 80° C.–85° C. under subatmospheric pressure (75 mm.) while eliminating continuously water of condensation until the resin gelled within 15 to 30 seconds when tested on a hot plate at 160° C. An additional 500 grams of ethylene glycol monoethyl ether were then added to chill the solution to a non-reactive temperature. The chilled resinous solution had a light amber color, a viscosity of about 200 centipoises and a solids content of 42% as determined by baking a ten gram sample in an open dish for three hours at 135° C. It was estimated that the molecular weight of the resin solid was between 500 and 1000.

EXAMPLE 11.—ALKALINE EARTH METAL HYDROXIDE CATALYZED ONE STEP PHENOL CRESOL FORMALDEHYDE RESIN

A mixture of one hundred grams of an 80/20 phenol ortho cresol mixture, 120 grams 37% formalin and 3.0 grams $Ba(OH)_2 \cdot 8H_2O$ was vacuum refluxed at 80° C. for 1½–2 hours, neutralized with phosphoric acid to pH 4.0–5.5; then 6.0 grams hexamethylenetetramine was added and the reaction mass then vacuum dehydrated at 75–100 mm. pressure to a temperature of 95° C.–100° C.; bodied at 95° C.–100° C. until a sample tested at 150° C. had a gel time of 100–110 seconds, discharged and cooled as rapidly as possible. The resin was hard, brittle and grindable with a melting point of 80° C.–90° C., average molecular weight 600 and soluble in ethyl alcohol or acetone.

EXAMPLE 12.—ALKALINE EARTH METAL HYDROXIDE CATALYZED ONE STEP, PHENOL-BUTYL PHENOL-FORMALDEHYDE RESIN

Nine hundred forty grams phenol, 60 grams p-tert-butyl phenol, 30 grams hexamethylenetetramine, 10 grams $Ba(OH)_2 \cdot 8H_2O$ and 80 grams water were heated to 80° C. under 310 mm. pressure while 1270 grams 37% formalin were added continuously over a 35-minute period while holding temperature at 79° C.–81° C. Mixture was then reacted for an additional 50 minutes at 80° C.; then 2.6 grams phosphoric acid and 50 grams hexamethylenetetramine were added in that order, the mixture dehydrated under 16″ vacuum to 70° C., a slurry of 19 grams nigrosine and 20 grams calcium stearate in 68 grams alcohol added, and vacuum dehydration continued to 100° C. to yield a brittle, fusible resin soluble in ethyl alcohol, with an average molecular weight of 660 and showing a gel time at 160° C. of 60–65 seconds.

EXAMPLE 13.—ALKALINE CATALYZED ONE STEP PHENOL-FORMALDEHYDE RESIN SOLUTION

One thousand grams phenol, 1200 grams 37% formalin and 27.5 grams of a 25% aqueous solution of NaOH were heated to boiling and refluxed at atmospheric pressure for 25–30 minutes; then cooled to 70° C.; neutralized with sulfamic acid to pH 6.4–7.0; dehydrated at 65 mm. pressure until 740 grams of distillate were collected; then 250 grams commercial ethanol were added to dissolve the residue. A solution consisting of 200 grams grade WW rosin in 200 grams alcohol were then added, the entire mixture then refluxed at atmospheric pressure for 20 minutes, cooled and discharged. The resultant solution had a viscosity of 170–200 cst. at 25° C. and a solids content of 60%.

EXAMPLE 14.—ALKALI CATALYZED ONE STEP PHENOL FURFURAL RESIN

In a resin reactor assembly equipped with a water separator, 1000 grams phenol, 730 grams furfural and 17 grams crude soda ash were heated carefully to 140° C. and held under total reflux at 140° C.–142° C. until reaction subsided (ca. 10–15 min.). Separator valves were then opened so that organic phase (furfural) would return to still and water would be removed; reaction mixture was then heated gradually (over ½ hour period) to 155° C.–157° C. and held at that temperature until water removal was substantially completed (1½ hours). Resin discharged to pans and cooled. It was a fusible, hard, brittle resin soluble in acetone or ethyl alcohol.

EXAMPLE 15.—MIXTURE OF TWO STEP RESORCINOL RESIN AND ONE STEP PHENOLIC RESIN (a) One thousand grams phenol, 960 grams 37% formalin and 100 grams $Na_2SO_3$ (tech.) were mixed together and temperature allowed to rise to 100° C.—cooling as needed to prevent over-violent reaction—then refluxed 20 minutes at 100° C. Reaction then cooled quickly to 60° C.; a solution of 36 grams $H_2SO_4$ in 144 grams $H_2O$ were added, and then dehydrated keeping temperature below 75° C. until 530 grams distillate were collected. The resultant liquid resin was then allowed to cool and settle for about eight hours. Precipitated sodium sulfate and other catalyst residues were removed by centrifuging. The liquid resin after centrifuging had a viscosity of 125–275 cst. at 25° C.

(b) A solution of 1000 grams resorcinol in 365 grams ethyl alcohol was cooled to below 50° C.; 520 grams 37% formalin were mixed in (ca. 10 minutes) and pH adjusted with phosphoric acid to 2.9–3.1. Mixture was then heated carefully to reflux and refluxed atmospherically (temp.=90° C.) for 3½–4 hours, cooled to 70° C., added 405 grams resin from (a), then added 21 grams technical KOH (dissolved in 42 grams $H_2O$), the system was then cooled to 50° C. and adjusted to viscosity of 250–400 cst. at 25° C. by adding or vacuum distilling off alcohol as needed; resultant solids content being about 60%.

EXAMPLE 16.—PHENOL-FORMALDEHYDE ANILINE RESIN

One hundred grams phenol and 150 grams 37% formalin were mixed together. Sixty-five grams aniline were added slowly with agitation and cooling as needed to hold temperature below 90° C. Mixture then refluxed (atmospheric) for three hours; cooled to 85° C.; 2.5 grams hexamethylenetetramine and 1.0 gram candelilla wax were added in that order, and dehydrated at 50–75 mm. pressure to a residue temperature of 100° C. The resin was then bodied at 100° C. until a sample exhibited a ring and ball softening point of 80° C.–90° C.; discharged and cooled rapidly. The resin was hard and brittle with a gel time of 140–170 seconds at 170° C. and soluble in ethyl alcohol.

EXAMPLE 17.—PHENOL-FORMALDEHYDE ANILINE RESIN (VINSOL MODIFIED)

One hundred grams phenol and 150 grams 37% formalin were mixed together. Sixty-five grams aniline were added slowly with agitation and cooling as needed to hold temperature below 90° C. Mixture was then refluxed for three hours at atmospheric pressure; then 46 grams "Vinsol,"[2] 2.5 grams hexamethylenetetramine and 1.0 gram candelilla wax were added in that order and the product dehydrated under 75–100 mm. pressure to a residue temperature of 100° C. The residue was discharged and cooled rapidly; the resulting resin was hard, brittle and grindable, melting point about 92° C. and soluble in ethyl alcohol.

EXAMPLE 18.—TWO STEP PHENOL-FORMALDEHYDE RESIN MODIFIED WITH ANHYDRO FORMALDEHYDE ANILINE (a) One thousand grams phenol and 650 grams 37% formalin were mixed, warmed to 60° C. and pH adjusted with $FeCl_3$ to 1.10–1.30. Temperature was brought up to 100° C. slowly (over one hour period), mixture refluxed at 100° C. for four hours, then dehydrated at atmospheric pressure to 160° C. and discharged into pan and cooled. The resultant resin was soluble in ethyl alcohol and has a melting point of 90° C.–95° C. The average molecular weight was 500.

(b) Anhydroformaldehyde aniline: A mixture of 485 grams 37% formalin and 515 grams aniline were reacted together by mixing in a kneader for 1 to 1½ hours; water was then centrifuged off, and the product dried in a vacuum drier at 95° C.–100° C. This product was a fusible, alcohol-soluble resin.

(c) Hexatriphenol: One mol phenol was added to solution of three mols hexamethylenetetramine in twice its weight of $H_2O$ and stirred for half an hour. The crystals were collected in a centrifuge and dried ca. 24–32 hours in vacuum drier at ca. 160° F.

(d) 66.4 parts (by weight) of the resin from (a), 25 parts anhydroformaldehyde aniline and 4.0 parts hexatriphenol were mixed with 4.6 parts hexamethylenetetramine and comminuted to a fine powder about 90% through 200 mesh.

EXAMPLE 19.—TWO STEP PHENOL-FORMALDEHYDE RESIN MODIFIED WITH ANHYDRO FORMALDEHYDE ANILINE (a) One thousand grams phenol and 670 grams 37% formalin were mixed together, cooled to below 45° C. by refluxing under 100 mm. pressure; the reaction mass was adjusted to pH 0.40–0.50 with HCl; gentle heat was applied and the pressure gradually increased so that after half an hour the pressure was 255 mm. and the temperature was 75° C.; held at 75° C. until phase separation occurred; then pressure gradually increased until the reaction was brought to atmospheric reflux. It was then refluxed at atmospheric pressure for one hour; then dehydrated at atmospheric pressure to 108° C.; neutralized with 25% aqueous NaOH and dehydrated to a residue temperature of 150° C., and then discharged into pans and cooled. The resulting resin was brittle and grindable, melting point 80° C.–85° C. and average molecular weight was 530.

(b) Four hundred fifty parts by weight of the resin from (a) were mixed with 550 parts anhydroformaldehyde aniline (prepared as described in Example 18(b)). The mixture was fluxed together on mixing rolls to a homogeneous sheet. The sheet was removed and cooled, and then comminuted to a powder about 90% through 200 mesh. The mixed product was a fusible resin soluble in ethyl alcohol.

[2] "Vinsol" is the trade name for a commercial resin-like product remaining after the distillation of rosin obtained from pine stumps.

EXAMPLE 20

Forty parts of the resin from Example 1, 36 parts of the resin from Example 4 and 24 parts of the resin from Example 11 were mixed together and ground to a fine powder about 90% through 200 mesh.

The effectiveness of a soil conditioner is dependent on the concentration used on the soil weight. A concentration of 0.1% of the dry soil weight was usually employed in the granule retention test. This corresponds to about 2000 pounds of soil conditioner per acre to a treated depth of six inches. The resins were employed in aqueous potassium hydroxide solution or in suspension to facilitate uniform dispersion in the soil. Where considerable quantities of caustic were required to dissolve the resin a small amount of concentrated sample solution was made with the required amount of caustic and this sample poured into a large volume of water to make a resin suspension. Care was exercised that the amount of solution added to give the desired concentration of resin was not in excess of the amount to bring the soil moisture content above the plastic limit since if this is done the soil tends to dry to a hard mass. The plastic limit of a soil is defined as the lowest moisture content, expressed as a percentage of the weight of oven dried soil at which the soil can be rolled in threads one-eighth inch in diameter without the threads breaking in pieces (ASTM D424–39, para. 1).

One method used for evaluating the effectiveness of the phenolic resins as soil conditioners in improving the stability of soil granules to the action of water is the soil granule retention test described below.

Fifty grams of soil which had been dried to constant weight at 70° C. under vacuum and ground to pass a 20 mesh sieve were mixed with an aqueous potassium hydroxide solution or suspension of phenol-aldehyde resin to give the desired concentration of resin based on the dry soil weight. The mixture of soil and resin was then formed into short strings of soil spaghetti about one-eighth inch in diameter which were then placed in an air drier and dried at room temperature and atmospheric pressure. The treated soil sample was then dry-sieved through a 60 mesh screen to remove fine material. Twenty-five grams of the portion remaining on the 60 mesh sieve were placed in a one-liter cylinder containing 600 cc. of distilled water, upended once, and allowed to stand for 30 minutes. The cylinder was then upended 30 times and its contents dumped onto a 60 mesh sieve. The 60 mesh sieve and its contents were then lowered into and out of a pan of distilled water thirty times. The dry weight of the soil remaining on the 60 mesh sieve after these operations, divided by 25 grams times 100 is reported as the percent soil granule retention.

The soil conditioner effectiveness of each of the phenol-aldehyde resins described in the Examples 1 to 20 was measured by the said Soil Granule Retention Test using various soils of poor natural stability namely Calhoun silt, Paulding clay #9 and Miami silt loam. The tabulated test data is set forth below in Tables I, II and III.

*Table I*

GRANULE STABILITY OF CALHOUN SILT SOIL

| Treatment Material | Granule Retention |
|---|---|
| Control | 3.6 |
| Example 18 | 59.0 |
| Example 1 | 46.0 |
| Example 4 | 35.0 |
| Example 12 | 26.0 |
| Example 7 | 25.0 |
| Example 5 | 22.0 |
| Example 9 | 17.0 |
| Example 10 | 15.0 |
| Example 11 | 15 |
| Example 3 | 13 |
| Example 13 | 12 |

Table II
GRANULE STABILITY OF PAULDING CLAY #9

| Treatment Material | Resin Type | Granule Retention |
|---|---|---|
| Control | | 7.2 |
| Example 18 | Anilino | 33.0 |
| Example 15 | Mixed one/two Step | 27.0 |
| Example 8 | One Step Hexa | 25.0 |
| Example 12 | One Step Ba(OH)$_2$ | 23.0 |
| Example 7 | One Step Hexa | 21.0 |
| Example 10 | One Step Amine | 21.0 |
| Example 2 | Two Step | 20.0 |
| Example 11 | One Step Ba(OH)$_2$ | 20.0 |
| Example 5 | One Step Hexa | 15 |
| Example 9 | One Step Amine | 15 |
| Example 3 | Two Step | 15 |
| Example 4 | One Step Hexa | 13 |
| Example 1 | Two Step | 12 |
| Example 6 | One Step Hexa | 11 |

Table III
GRANULE STABILITY OF MIAMI SILT LOAM SOIL

| Treatment Material | Resin Type | Granule Retention |
|---|---|---|
| Control | | 21.3 |
| Example 13 | One Step Alkali | 55.0 |
| Example 12 | One Step Ba(OH)$_2$ | 53.0 |
| Example 19 | One Step Amine | 47.0 |
| Example 7 | One Step Hexa | 45.0 |
| Example 14 | One Step Alkali | 45.0 |
| Example 4 | One Step Hexa | 44.0 |
| Example 6 | do | 43.0 |
| Example 16 | Anilino | 42.0 |
| Example 5 | One Step Hexa | 39.0 |
| Example 8 | do | 39.0 |
| Example 11 | One Step Ba(OH)$_2$ | 38.0 |
| Example 18 | Anilino | 34.0 |
| Example 20 | Mixed One Step/Two Step | 33.0 |
| Example 17 | Anilino | 32.0 |
| Example 15 | Mixed One Step/Two Step | 30.0 |
| Example 3 | Two Step | 29.0 |
| Example 1 | do | 28 |
| Example 10 | One Step Amine | 28 |
| Example 9 | do | 26 |
| Example 2 | Two Step | 25 |

It is apparent from an inspection of these results that generally speaking all of the phenolic or modified phenolic resins were effective as soil conditioners in one or more of the three soils tested.

Judging from these tests the two step resins are most effective in the Calhoun silt soil and of lesser effect in the other soils. The resin of Example 18 was particularly effective on Calhoun silt soil. The two step resins tested were all solid, brittle fusible resins.

Of the one step resins tested the hexamethylenetetramine catalyzed or hexamethylenetetramine modified were most effective. Such resins were as a class the best in Paulding clay and Miami silt loam, but not much better than the two step resins in Calhoun silt. The one step resins tested were employed both in liquid and solid form or in solution in a solvent such as alcohol or 2-ethoxy ethanol-1. Since the one step resins are reactive, i.e. they tend to become infusible and insoluble during storage, the tests employing these resins were generally made with freshly prepared resin samples. However, in some instances it was observed that aged but still fusible samples were at least as effective as fresh ones. Tests using completely cured samples as for example the resins from Examples 4, 13, and 18, i.e. resins which were hardened to the point of infusibility and insolubility showed that such resins were ineffective as soil conditioners in all soils tested. This demonstrates that the phenolic resins should be fusible and soluble in organic solvents such as alcohols or ketones in order that they be effective as soil conditioners. They should, however, be water insoluble or at the most tolerate only dilution with water to the extent of about one part of water to one part of resin. One-step resins which can be diluted with water significantly beyond this extent and having a Menzies-Wright molecular weight of less than 300 have proven generally unsatisfactory as soil conditioners.

In addition to fusibility, solubility in an organic solvent and water insolubility it was found that both two-step and one-step resins which have been modified by the incorporation of phenol-formaldehyde-aniline or anhydroformaldehyde aniline resins either as mixtures or as co-reactants were satisfactory soil conditioners and in particular the resin of Example 18 was effective in Calhoun silt soil and in Paulding clay. These aniline modified resins are brittle, grindable, solid resins and like the one-step are heat-hardenable per se to infusible insoluble resins. The effectiveness of these aniline modified resins is somewhat unexpected since the anhydroformaldehyde-aniline resin tested alone did not prove to be an effective soil conditioner. It is also to be noted that hexatriphenol, and hexamethylenetetramine by themselves have been found ineffective for conditioning soil.

In order to further appraise the value of the phenolic resins as soil conditioners field tests were conducted on the resins from Example 1 and Example 18. This test was conducted by sinking a large number of five gallon cans into the described soils until their tops were flush with the soil surface, the bottoms and tops of these cans having been previously removed. The soils within these cans, which were approximately 12 inches in diameter and 18 inches deep, were treated to a six inch depth with the resin treatment materials. These different soil conditioner concentrations were used: 3,000, 1,000 and 300 pounds per acre, and each of the three concentrations was repeated four times on thirteen representative soils taken from various parts of the United States. Results of a fall crop of turnips are shown in Tables IV and V.

Table IV

| Soil Treatment Material | Conc., lbs./acre | Soil | Turnip Crop Weight | |
|---|---|---|---|---|
| | | | Top Weight, g. | Root Weight, g. |
| Control | | Calhoun Silt | | 59 |
| Ex. 1 | 300 | do | | 169 |
| Control | | Iowa Loam | 147 | |
| Ex. 1 | 300 | do | 291 | |
| Ex. 18 | 300 | do | 287 | |
| Control | | Sharkey Clay | | 59 |
| Ex. 1 | 300 | do | | 168 |
| Control | | New York Muck | | 90 |
| Ex. 18 | 1,000 | do | | 157 |
| Control | | Ontario Loam | 35 | |
| Ex. 1 | 3,000 | do | 126 | |

By way of comparison a commercial polyacrylic acid soil conditioner required a 1,000 pounds per acre concentration in Calhoun silt to yield a root weight of 144 gm.; and in Sharkey clay a 1,000 pounds per acre concentration produced a root weight of 145 gms.

Table V

| Soil Treatment Material | Conc., lbs./acre | Top Weight, g. | Root Weight, g. | Confidence Level,[1] percent |
|---|---|---|---|---|
| Control | | 69 | 218 | |
| Ex. 1 | 1,000 | | 367.2 | 95 |
| Ex. 18 | 3,000 | | 337.2 | 95 |
| Ex. 18 | 300 | 97.2 | | 85 |

[1] Confidence Level at which given value is significantly higher than untreated controls.

The soils used in these tests were as follows:

| Soil | Location |
|---|---|
| Clarinda clay loam | Iowa. |
| Imperial clay | California. |
| Monongahela silt loam | West Virginia. |
| Sharkey clay | Mississippi. |
| Miami silt loam | Ohio. |
| Oklahoma blow soil | Oklahoma. |
| New York muck soil | New York. |
| Gloucester loam | New York. |
| Norfolk fine sandy loam | Mississippi. |
| Calhoun silt | Tennessee. |
| Ontario loam | New York. |
| Paulding clay | Ohio. |
| Redding gravelly loam | California. |

An example of the change in soil workability which is brought about by the addition of phenolic resin is illustrated as follows. A number of different representative soils from various parts of the United States were prepared for outdoor exposure testing by first pulverizing the dried soils in a jaw crusher and then mixing the following ingredients in a sigma-blade mixer: dried pulverized soil, organic matter additions, suitable quantities of plant nutrient materials, sufficient water to bring the soil moisture content up to 80% of the particular soil's plastic limit, and resin from Example 1. These materials were mixed in the sigma-blade mixer for five minutes and the damp, treated soil was then placed in a steel flat which measured 12 inches by 24 inches by 3 inches high, inside dimensions. This flat had a screened bottom consisting of coarse mesh expanded metal screen, over which was laid an 80 mesh stainless steel screen. Flats were placed outdoors in contact and flush with the ground, which consisted of a B horizon Monongahela sandy loam. The flat was tilted on a 51 degree angle from the horizontal along its long axis, facing northwest (the direction of prevailing storms in the locality).

The soils contained in these flats were subjected to outdoor weathering for an extended period of time. They were tested for soil surface penetrability in the following manner. A tapered wood bob whose length was accurately calibrated in tenths of inches and equipped with counter-sunk weights to bring its total weight up to 28.7 grams, and with a metal plate fixed to the large end, was suspended in the top of a 48 inch long tube by means of an electromagnet. The electromagnet current was broken, thus releasing the penetrometer bob and causing it to fall into the surface of the soil in these test flats. Accurately dropped and reproducible measurements of the depth of penetration of this bob could be made in this manner. At the end of two weeks' outdoor exposure, during which several rainfalls were experienced, penetrability measurements on a flat treated with 0.1% resin from Example 1 showed an average penetrability of 18.7 arbitrary units. This compares with a control value of 13.0 units.

In another field test, samples of the resins from Examples 1 and 18 were applied at the rate of 0.1% of the soil weight by dusting the solid resin in the form of a powder about 60% to 90% through 200 mesh onto plots of Salt Lake silt loam. The plots were then double tilled with a rotatiller to a depth of five inches, the entire area then disced once with a disc harrow and then seeded with a variety of crops. The final yield on all crops was excellent and the resin of Example 18 was particularly effective in bringing about an early emergence of sweet clover.

What is claimed is:

1. Method of improving the tilth of surface soil granules and increasing the resistance of said granules against the erosive action of water which comprises incorporating in the surface soil a small amount of a fusible, resinous condensation product of a phenol and an aldehyde said condensation product having less than about 50% by weight of water soluble components.

2. Method of improving the tilth of surface soil which comprises incorporating in the surface soil from 0.001 to 2.0 percent by weight of a fusible, resinous condensation product of a phenol and an aldehyde, said condensation product having an average molecular weight between about 350 and 2000 and containing less than about 50 percent by weight of water-soluble components.

3. Method of improving the tilth of surface soils which comprises incorporating in the surface soil from 0.001 to 2.0 percent by weight of a finely comminuted fusible, resinous condensation product of a phenol and a saturated aldehyde, said condensation product having an average molecular weight between about 350 and 2000 and containing less than 50 percent by weight of water-soluble components.

4. Method of improving the tilth of surface soils which comprises distributing in the surface soil per acre thereof and to depth of about six inches from 300 to about 3000 pounds of a fusible resinous condensation product of a phenol and a saturated aldehyde, said condensation product having an average molecular weight of at least 350 and containing less than about 50 percent by weight of water-soluble components.

5. Method of improving the tilth of surface soils which comprises incorporating in the surface soil a water-stabilizing amount of a novolak condensation product of phenol and formaldehyde, said product having an average molecular weight of at least 350 and containing less than about 50% by weight of water-soluble components.

6. Method of improving the tilth of surface soils which comprises incorporating in the soil a water-stabilizing amount of a substantially water-insoluble, aniline modified novolak condensation product of phenol and formaldehyde.

7. Method of improving the tilth of surface soils which comprises dispersing in the soil a water-stabilizing amount of a fusible, substantially water-insoluble, anhydro-formaldehyde aniline modified phenol-formaldehyde resin.

8. Method of improving the tilth of surface soils which comprises dispersing in the soil a water-stabilizing amount of a fusible, resinous condensation product of para-tertiary-butyl phenol and formaldehyde having a molecular weight above 350.

9. Method of improving the tilth of surface soils which comprises incorporating in the soil from 0.001 to 2.0 percent by weight of a heat-hardenable resinous condensation product of phenol, formaldehyde and hexamethylenetetramine, said condensation product being substantially water-insoluble.

10. Method of improving the tilth of surface soils which comprises incorporating in the surface soil from 0.001 to 2.0 percent by weight of a fusible resinous condensation product of a phenol and an aldehyde in the form of a dispersion in an aqueous alkali solution said condensation product having less than about 50% by weight of water soluble components.

11. Method of improving the tilth of surface soils which comprises incorporating in the surface soil from 0.001 to 2.0 percent by weight of a fusible condensation product of a phenol and an aldehyde in the form of a solution in an organic solvent said condensation product having less than about 50% by weight of water soluble components.

12. Surface soil having distributed therein an amount of a preformed fusible condensation product of a phenol and an aldehyde said condensation product having less than about 50% by weight of water soluble components imparting to the soil granules resistance to water erosion.

13. Surface soil having distributed therein from 0.001 to 2.0 percent by weight of a preformed fusible condensation product of a phenol and an aldehyde said condensation product having less than about 50% by weight of water soluble components.

14. Surface soil having distributed therein from 0.001 to 2.0 percent by weight of a preformed resinous novolak condensation product of phenol and formaldehyde said condensation product having less than about 50% by weight of water soluble components.

15. Surface soil having distributed therein from 0.001 to 2.0 percent by weight of a substantially water-insoluble, preformed fusible resinous condensation product of phenol, formaldehyde and hexamethylenetetramine.

16. Surface soil having distributed therein from 0.001 to 2.0 percent by weight of a substantially water-insoluble, preformed fusible resinous condensation product of a phenol and an aldehyde modified with minor amounts of hexamethylenetetramine triphenol and anhydroformaldehyde aniline.

17. Surface soil having distributed therein from 0.001 to 2.0 percent by weight of a substantially water-insoluble preformed fusible condensation product of para tertiary butyl phenol and formaldehyde.

18. Surface soil having distributed therein from 0.001 to 2.0 percent by weight of a preformed fusible resinous condensation product of a phenol and an aldehyde, said condensation product having an average molecular weight between about 350 and 2000, and containing less than about 50 percent by weight of water-soluble components.

References Cited in the file of this patent
UNITED STATES PATENTS

| | | |
|---|---|---|
| 2,620,319 | Rowe et al. | Dec. 2, 1938 |
| 2,527,581 | Searer et al. | Oct. 31, 1950 |

OTHER REFERENCES

Clare et al.: "Journal Applied Chem.," August 2, 1952, pages 456 to 463.

Ellis: "Chemistry of Synthetic Resins," 1955, volume I, pages 328, 347, 345 and 346.

Wakeman: "The Chemistry of Commercial Plastics," 1947, page 123.